United States Patent Office 3,063,262
Patented Nov. 13, 1962

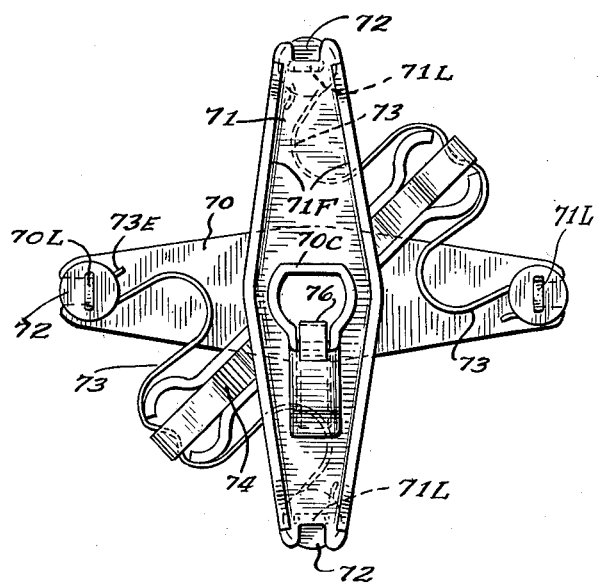
Fig.1
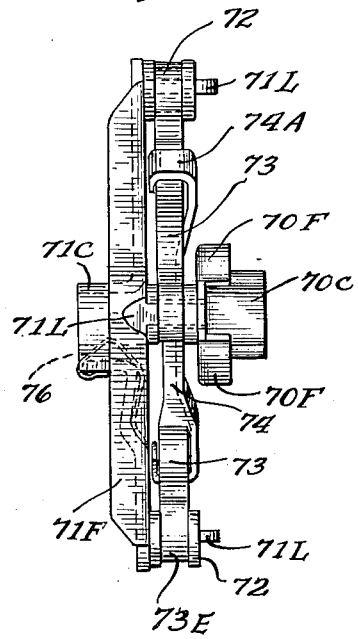
Fig.2
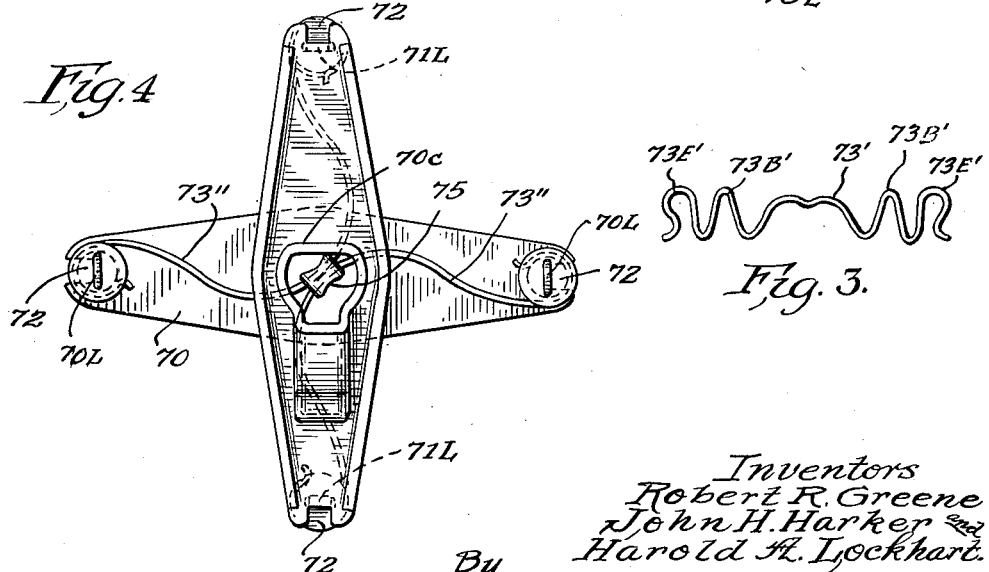
Fig.4
Fig.3.
Inventors
Robert R. Greene
John H. Harker and
Harold H. Lockhart
By Mann, Brown and McWilliams
Attys.

3,063,262
FLEXIBLE COUPLER
Robert R. Greene, Chicago, John H. Harker, Park Ridge, and Harold A. Lockhart, Wauconda, Ill., assignors to Bell & Gossett Company, a corporation of Illinois
Original application Apr. 24, 1959, Ser. No. 808,790. Divided and this application Feb. 20, 1961, Ser. No. 99,003
6 Claims. (Cl. 64—27)

This invention relates to an improved flexible coupler useful, for example, in motor pump units and has for its principal object the provision of a flexible coupler arrangement of improved construction.

Other objects and advantages will become apparent during the course of the following description.

In the accompanying drawings forming a part of this specification and in which like numerals are employed to designate like parts throughout the same:

FIG. 1 is an end elevational view of a flexible coupler assembly constructed in accordance with this invention;

FIG. 2 is a side elevational view of a flexible coupler assembly of FIG. 1;

FIG. 3 is an end elevational view of a connection spring of modified construction for use in the flexible coupler assembly of FIG. 1; and FIG. 4 is a view corresponding to that of FIG. 1 and illustrating an alternative embodiment of a flexible coupler assembly.

The flexible coupler arrangement of this disclosure may be constructed of stamped parts and offers important operating advantages in addition to being inexpensive to manufacture. The flexible coupler assembly may be positioned in coupling engagement between a motor shaft, not shown, and a pump shaft, not shown, and in the embodiment illustrated in FIGS. 1 and 2 the flexible coupler includes cooperating coupler halves 70 and 71 of stamped plate construction, each coupler having an integral lug 70L and 71L, respectively, at each end and a central collar 70C and 71C, respectively, defining a mounting socket for its shaft with a separate leaf spring 76 arranged within each collar to engage the shaft. Finally the coupler halves are provided with stiffening edge flanges 70F and 71F and the coupler halves are arranged in right-angle relation and intersect in substantially coaxial alignment. The coupler halves are interconnected to accommodate limited shifting of the axis of the motor shaft which is usually mounted on rubber rings to ensure its quiet operation.

The coupler halves are interconnected by a novel linkage arrangement for reducing transmission of the mechanical vibrations from the motor to the pump piping. The connection structure for each coupler half is arranged at points adjacent its opposite ends and is embodied in the form of post-shaped grommets 72 of a suitable rubber-like material and fixed in telescoping relation over the coupler lugs 70L and 71L. The grommets have a large head to facilitate anchoring engagement with opposite ends 73E of a pair of smoothly curving, generally wave-shaped leaf springs 73. The center points of the leaf springs are preferably interconnected by an equalizer bar 74, the opposite ends of which are shaped for engagement between these points. The coupler bar is also of stamped construction and at each end is formed with an abutment wall 74A flanked by a pair of smoothly contoured locator pins 74F provided on opposite ends of stiffening flanges formed along opposite edges of the coupler bar. The locator pins 74F face the abutment wall and cooperably receive and engage the center bends in the leaf springs to maintain the proper positioning of the leaf springs with respect to the coupler bar. The leaf springs are light and weak to effectively isolate low-frequency mechanical vibrations but not high-frequency mechanical vibrations. The rubber posts complement the leaf springs in that they isolate the high-frequency vibrations but not the low-frequency vibrations. The substantial width of the leaf springs facilitates effecting substantially wear-resistant connections to the rubber grommets and offers important operating advantages over thin wire springs that would inevitably cut into the piece to which they are connected in these flexible coupler assemblies. Large wire springs are not suitable because unduly large mass is involved.

In FIG. 3, an alternative configuration of the leaf-type connection spring is shown at 73′ for use where a somewhat stronger spring action is desired. The spring 73′ has the same center and end configuration as the spring 73 but on each side includes an additional cycle of bends, as indicated at 73B′.

A further simplified flexible coupler assembly is shown in FIG. 4 wherein a unique arrangement of leaf springs 73″ of half-wave configuration is provided between the coupler halves 70 and 71. The springs 73″ are mounted to rubber grommets and are located and shaped to dispose their center points in adjacent relation. An equalizer sleeve 75, preferably of rubber-like material, encircles and frictionally engages the springs 73″ to stabilize the coupler halves.

The foregoing arrangements reduce centrifugal unbalance by minimizing the mass of the suspended linkage and the combination of the rubber posts and leaf springs handles the complete range of frequencies of mechanical vibrations and effectively isolates the motor and the pump piping.

This application is a division of application 808,790 filed April 24, 1959.

We claim:

1. In a flexible coupler assembly that includes cooperating coupler halves each having connection points adjacent opposite ends thereof and arranged for rotation about a substantially common axis that intercepts the plane of rotation of each coupler half at a point substantially midway between the connection points thereof, and a resilient linkage connecting said coupler halves in torque-transmitting relation and including cooperating leaf springs each having a wave-like shape for flexing movement in a plane substantially normal to said axis and connected individually to react between a separate connection point on one of said coupler halves and a separate connection point on the other coupler half to act in balanced opposition and define a balanced neutral position and an equalizer member engaged to each spring at its midpoint.

2. The arrangement of claim 1 wherein a post of rubber-like material is provided at each connection point to resiliently connect the leaf springs and couplers in torque-transmitting relation.

3. In a flexible coupler assembly, the combination with cooperating coupler halves each having connection points adjacent opposite ends thereof and arranged for rotation about a substantially common axis that intercepts the plane of rotation of each coupler half at a point substantially midway between the connection points thereof, and a rotatable equalizer member arranged between said coupler halves, of a resilient linkage connecting said coupler halves in torque-transmitting relation and comprising a pair of leaf springs each having a wave-like shape for flexing movement in the plane of the equalizer member, said springs each having opposite ends thereof individually anchored to react between separate connection points on the coupler halves and each having its midpoint in engagement with the equalizer member.

4. The arrangement of claim 3 wherein a post of rubber-like material is provided at each connection point to resiliently connect the leaf springs and couplers in torque-transmitting relation.

5. In a flexible coupler assembly, the combination of cooperating coupler sections each having connection points adjacent opposite extremities thereof and arranged for rotation about a substantially common axis that intercepts each coupler section at a point substantially centrally of the connection points thereof, a rotatable equalizer member arranged in a plane parallel to said coupler sections and a resilient linkage connecting said coupler sections in torque transmitting relation and having a pair of leaf springs each having a wave-like shape for flexing movement in a plane parallel to said coupler sections, said springs each having opposite ends thereof individually anchored to react between separate connection points on the coupler sections and each having its midpoint engaged to the equalizer member.

6. In a flexible coupler assembly, the combination of cooperating coupler sections each having connection points adjacent opposite extremities thereof and arranged for rotation about a substantially common axis that intercepts each coupler section at a point substantially centrally of the connection points thereof, a rotatable bar arranged in a plane parallel to and intermediate of said coupler sections and a resilient linkage connecting said coupler sections in torque transmitting relation and having a pair of leaf springs each having a wave-like shape for flexing movement in the plane of the equalizer member, said springs each having opposite ends thereof individually anchored to react between spaced ones of said connection points on the coupler sections and each having its midpoint engaged to an opposite end of the equalizer member.

References Cited in the file of this patent
UNITED STATES PATENTS

| | | |
|---|---|---|
| 1,145,602 | Lieber | July 6, 1915 |
| 1,932,205 | Dina | Oct. 24, 1933 |
| 2,627,733 | Amberg | Feb. 10, 1953 |